Oct. 28, 1952     O. WERTHEIM ET AL     2,615,415
SOLDERING DEVICE
Filed Aug. 19, 1949     2 SHEETS—SHEET 1
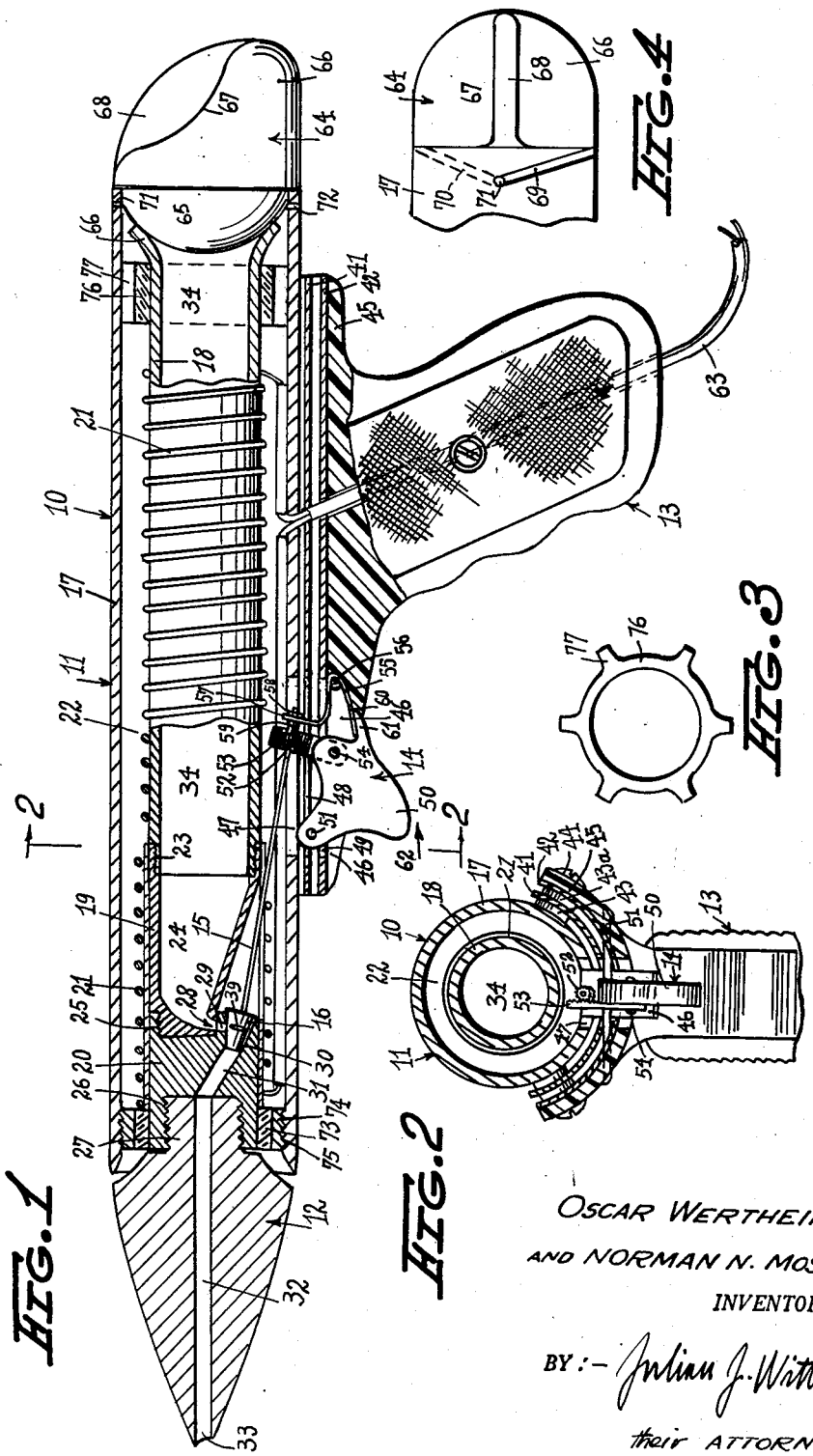
OSCAR WERTHEIM,
AND NORMAN N. MOSS.
INVENTORS.
BY:— Julian J. Wittal,
their ATTORNEY.

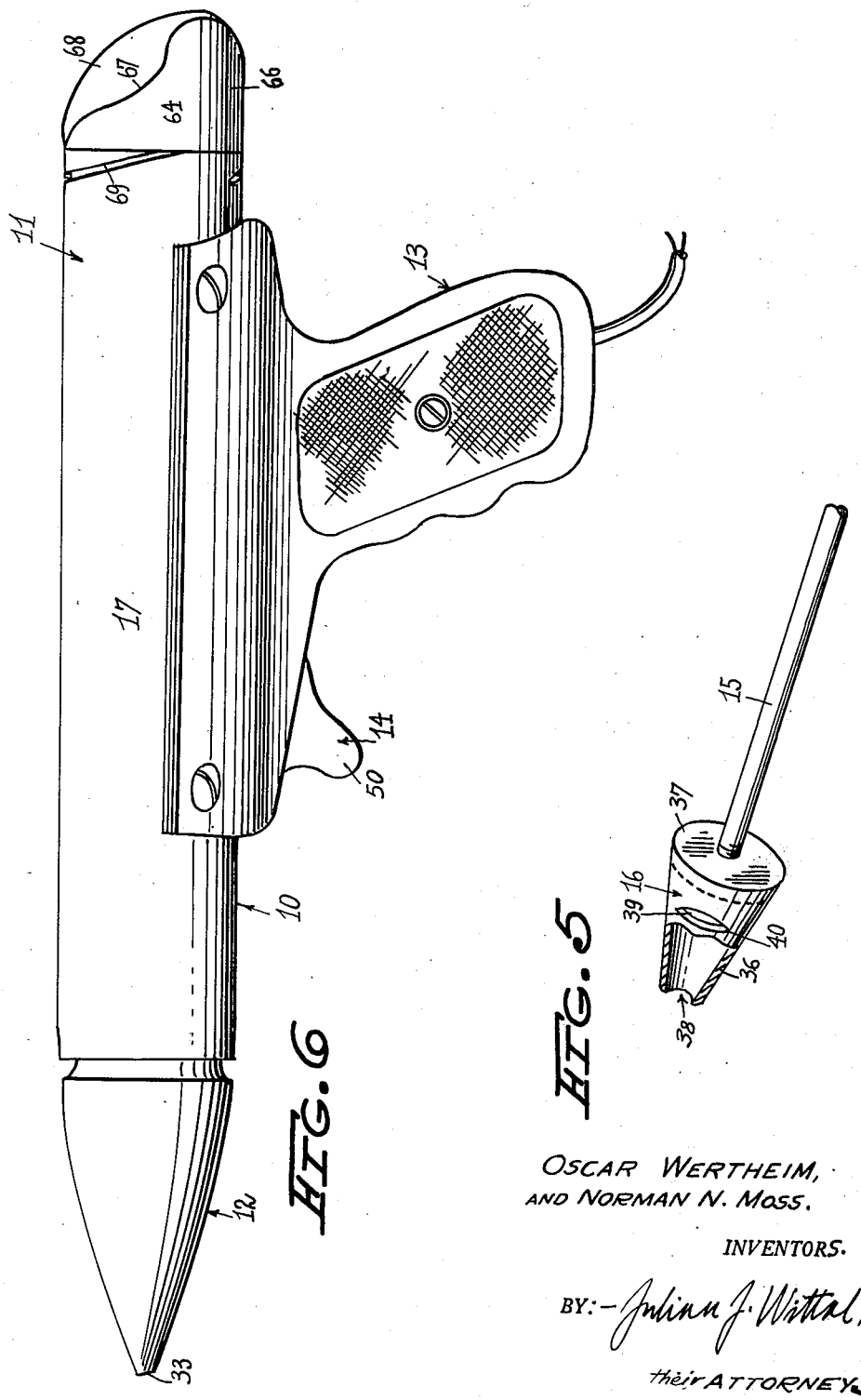

Patented Oct. 28, 1952

2,615,415

UNITED STATES PATENT OFFICE 2,615,415

SOLDERING DEVICE

Oscar Wertheim and Norman N. Moss,
New York, N. Y.

Application August 19, 1949, Serial No. 111,124

6 Claims. (Cl. 113—109)

This invention relates to soldering devices and has for its main object to provide a device of this character which will be more efficient than similar devices proposed heretofore, particularly it will be adapted to very fine control and adjustment in the soldering material ejected therefrom.

Another object of our invention is to provide a rotary valve to control the flow of the soldering material from our device, said valve having a novel opening to aid in said fine adjustment and control of the flow.

Still a further object of our invention is to provide the valve and its operating mechanism substantially free and outside of the soldering material reservoir and its associated parts, whereby said valve mechanism will be adapted to better operation, easy access, and ready assembly or disassembly.

Still further objects of this invention will be apparent as the specification of the same proceeds, or will be pointed out therein, and, among others, to provide a device of this type which will be very simple in construction, contain only a few parts, and which it will be easy to assemble and disassemble.

In the drawings forming a part of this specification and accompanying the same:

Fig. 1 is a longitudinal sectional view of our novel electric soldering device;

Fig. 2 is a cross-sectional view, the section being taken on the line 2—2 of Fig. 1; and portions of the device having been removed;

Fig. 3 is a plan view of an insulating spacing member used in our device;

Fig. 4 is a fragmentary elevational view of the top end of our device showing a plug for the same with closure means employed thereon;

Fig. 5 is a perspective view of a novel valve used in our device; and

Fig. 6 is a side view of the soldering device.

Referring to the drawings more in detail by characters of reference, the numeral 10 indicates our device, in general, being composed of four main parts as follows: A barrel section generally indicated by the numeral 11, a tip 12, a grip 13, and a trigger mechanism 14, operating a shaft 15 which carries a novel regulating valve 16 between members in barrel 11 and the tip 12, as will be more fully described presently. The barrel section 11 is mainly composed of an outer tube 17 and an inner tube 18 which inner tube is continued in the intermediate guide and channel members 19 and 20.

An electrical heating device 21 is secured on and around the inner tube 18 and the intermediate members 19 and 20, said unit being any of the well known constructions and being indicated in a more or less diagrammatical manner only.

A comparatively large space 22 is provided between the outer tube 17 and the other mentioned inner members, this space providing a heat insulating medium whereby the outer tube 17 will remain comparatively cool even while the inner members will be heated to high temperatures.

The intermediate member 19 may be in the form of a casting secured on the tube 18 as by screw threads 23 having comparatively thin walls and a large inner space 24.

A second intermediate member 20 also may be in the form of a casting secured at the lower end of the member 19 by the screw threads 25 and in the embodiment shown it may have a recess 26 into which is screw threaded an upper cylindrical portion 27 of the tip 12. The two tubes and the first intermediate member 19 preferably will be made of very light metal material, like aluminum or magnesium or their alloys, but the second intermediate member 20 we prefer to make of stainless steel for reasons to be pointed out hereinafter. The tip 12 may also be of an appropriate metal, like copper.

An exit aperture 28 is provided at the bottom of the first intermediate member 19 and is continued in a short guide bore or channel 29 through the second intermediate member 20 communicating with a conical valve seat or recess 30, which, again, is continued by the communicating channels or bores 31 and 32 in member 20 and in the tip member 12 terminating in the operating point or exit opening 33 for the device.

We may remark at this point of our specification, that, as will be obvious to those versed in this art, any appropriate soldering alloy whether in the form of a rod or scrap will be placed into the space 34 of the inner tube 18, the electrical heating unit may operate through an appropriate switch whereby the soldering material will be caused to melt, and in such liquid state it will flow out through the exit opening 28 and the mentioned various channels to the tip 33 of the device.

A regulating valve, generally indicated by the numeral 16, however, is inserted into the valve seat or recess 30 normally being closed and blocking the flow of the molten soldering alloy.

In Fig. 5 a more detailed view of valve 16 is indicated and it will be seen that it is in the form of a hollow truncated cone having the wall 36 and being closed at the top, as at 37, but open at the bottom, as at 38. However, a generally elliptical transversely placed inlet opening 39 is provided in the wall 36 having predetermined narrow substantially pointed ends 40.

In the normal position of our device, the opening 39 is out of registry with the inlet bore 29 for the molten soldering material and it will be seen that upon a turning of the valve 16 in either direction until the opening 39 begins to register with the bore or channel 29 a very finely adjusted and controlled flow of the soldering material may be permitted to reach the operating tip 33 of our device.

A shaft 15 is secured on the valve, and the rotation of the shaft will be executed by a trigger mechanism 14, as has been mentioned hereinbefore, and the operation of which will now be described.

We provide a handlle grip 13 for our device preferably of nonheat-conductive material, like plastic, in the shape as indicated in Figs. 1, 2 and 6. In the preferred embodiment of our device a curved inner plate 41 will be placed on the outer tube 17, where the grip 13 is to be secured, said plate being spaced apart from the tube. A second similar plate 42 will be placed, spaced apart from said first plate, said tube and the plates having nonheat-conducting spacing bushings 43 and 43a therebetween, as shown.

Securing screws 44 may be employed through the portion 45 of the grip 13 by which the same rests on the outer plate 42, then through the two plates, the two bushings and into the tube 17. It will be seen that two air spaces will heat insulate the grip from the tube 17.

At the lower end of the grip 13 an appropriate recess or opening 46 is provided in the same for receiving the trigger 14 and its associated parts and registering openings 47, 48 and 49 are also provided in the tubes 17 in the inner plate 41 and the outer plate 42. A trigger proper 50 as of the shape indicated in Fig. 1, is pivoted on pin 51, said pin 51 being removably secured at its two ends in the outer plate 42 and the base portion 45 of the grip 13, as indicated in Fig. 2.

The shaft 15 carries pinion 52 adjacent to its outer end and a rack 53 is in operating engagement therewith, said rack preferably being pivoted on the trigger 50, as at 54.

A double acting flat spring 55 is secured in the upper portion of a space 46 in the grip 13, as by the pin 56. An inner spring arm 57 of the spring, carries a thicker or boss portion 58, having a bearing aperture for the outer respective end of the shaft 15, as will be understood.

The shaft also carries a collar 59 underneath the spring arm 47, said arm strongly pressing against the collar 59 and thereby pressing the valve 16, at the end of the shaft, strongly and sealingly against its seat 30.

The spring 55 will also have an outer spring arm 60, engaged by a projection 61 on the trigger body 50, and said arm 60 will have an outward spring tension whereby the trigger will normally be in an outward position, in which position the valve 16 will not be in communication with the channel 29.

When it is desired to operate our device, the trigger will be pulled upwardly, as indicated by the arrow 62, as will be understood, and the rack 53 will rotate the pinion 52 and therewith the shaft 15 and the valve 16, and in this manner a gradually widening controlled opening may be provided for the exit of the soldering material.

It also will be seen that our novel trigger, shaft, and valve mechanism is adapted to very fine adjustment so that soldering material from the smallest, almost infinitesimal, amounts to the larger necessary quantities may be passed to the operating point 33 in a simple, easy and efficient manner. An electrical cable 63 may be passed through the grip 13 to provide the heating unit 21 with the necessary electrical energy, when desired.

The upper end of our device is closed by a plug 64 having a plug proper portion 65 composed of asbestos, or other proper heat insulating material, sealingly fitting in the flaring end 66 of the inner tube 18. For better effect both, the plug proper 65 and the flaring end 66, may be made rounded. The outer operating part 66 of the plug may have a lowered portion 67 from which rises a central knob or grip 68 to facilitate a turning of the plug 64 when it is desired to seal our soldering device. One method for such sealing may consist in providing oppositely inclined slots 69 and 70 at the two sides of the outer tube 17 and pins 71 and 72 on the plug device riding in the respective slots.

It will be seen that when the plug is turned in one direction it will move outwardly and free the outer opening or mouth of the device whereby it may be filled with soldering material. When it is desired to seal the same, pins 71 and 72 may be inserted into the slots 69 and 70 and the plug turned in the opposite direction until it safely seals the feeding end of our device. Here, also, it will be understood that other removable sealing and locking means may be employed, as, for instance, the plug 64 may operate with an appropriate screw thread and screw engagement with the tube 17.

As has been mentioned, most of the metal parts of our device will be made of aluminum, magnesium, or their alloys, for the sake of lightness, with the exception of the outer intermediate member 20 which we prefer to make of stainless steel, and, of course, the operating tip 12 may be made of copper. The valve 16 also we prefer to make of stainless steel, the reason being that stainless steel only expands to a very limited manner upon raising its temperature and the seat and valve also being of the same material, the valve 16 will always be in tight sealing engagement with its seat but still adapted to be turned or rotated.

It may be noted that other cooperating means may be employed between the trigger 50 and the shaft 15 than the rack and pinion device described, like appropriate strong frictional engagement between suitable parts, or a lever and crank device, or the like.

In a similar manner other forms of bearings may be provided for the shaft 15, and the flat spring 55 may also be replaced by different devices having similar effect. However, it will be seen that the branch 57 of the valve will have a strong downward tendency and thereby will press the valve 16 tightly into its seat and prevent a creeping of the molten soldering material around the valve, as by capillary action, which is one of the drawbacks of regulating valves for soldering devices proposed heretofore. The outer arm 60 of the spring 55 will have a tendency to return the trigger and the valve into their inoperative normal position.

At the outer end of the second intermediate member 20 we secure an insulating ring 73 which, for instance, may be made of asbestos material, on which is a screw threaded metal ring 74, and the respective end of the outer tube 17 may be secured on the inner part of our device by screw threaded action, as indicated at 75.

Adjacent to the other upper end of the tube 17 we employ a second insulating asbestos ring 76 which may have spaced apart ribs 77 around its circumference (Figs. 1 and 3) whereby an insulating reinforcing and spacing means is provided between the inner tube 18 and the outer tube 17 near the flaring end 66 of the inner tube.

It will be seen that our device has relatively few and simple parts. It will be light in weight, and of efficient and attractive streamlined design.

It also will be apparent that assembly or disassembly of our device will be extremely simple and may be done easily and quickly. For this purpose screws 44 will be removed thereby removing the securing grip 13 from the device, then the pins 51 and 56 for the trigger and for the flat spring 55, respectively, may be removed, whereupon the whole trigger with the spring and the rack 62 may simply be lifted off the outer end of the shaft 15 and then the shaft and its valve 16 may be removed. The device may be assembled in a similar easy, simple manner, but through reverse order of movements.

We want to remark that instead of rotating a hollow valve, having a communicating opening with the channel of the soldering material, said opening being gradually widening and being extremely fine and pointed at its end, valves of similar principle but other constructions than the one shown may be used, or instead of rotating, they may be operated by lifting or other suitable methods.

If desired, the operating metal tip 12 of our device may have a hollow space therein and an additional electrical heating unit may be placed thereinto connected to the source of current 63 by any suitable means.

While we have shown a preferred embodiment of our invention, it is to be understood that changes and variations may be resorted to in the elements, construction and operation of our invention, and we reserve our rights to such changes and variations as are within the spirit of this specification and the scope of the claims hereunto appended.

One such change may consist in providing slots or other openings in the outer tube 17 so as to produce air circulation and improve the cooling effect of the mentioned air space.

We also want to remark that our trigger mechanism and the shaft 15 with valve 16 may be removed without removing the grip 13. For this purpose only the pivot pin 51 of the trigger 50 will first be removed, whereupon the trigger and the shaft and valve may readily be lifted out of the device. The spring arm 57 may be bent upwardly to release the upper end of the shaft 15.

What we claim as new and desire to protect by Letters Patent of the United States is:

1. In a soldering device having a tubular reservoir with heating means associated therewith, and an operating tip member outside of said reservoir and secured to the bottom end thereof, the combination of, a portion of the inner end of said tip member being at one side of the bottom of the reservoir and being accessible, a truncated conical valve seat in said portion, the wider end of said seat being open, a first channel connecting an opening in the side of the valve seat with the reservoir, a second channel connecting an opening in the bottom of the valve seat with the lower end of the operating tip member, a hollow truncated conical valve tightly but rotatably fitting into said valve seat, an opening in the bottom of said valve communicating with said second channel, an opening in the side of said truncated hollow valve communicating with said first channel whereby when said opening in the side of the valve is placed into registering relation with the said first channel soldering material may flow from the reservoir through the valve to the operating tip of the device, a shaft carrying said valve and projecting upwardly generally along said tubular reservoir and outside thereof, spring means acting on said shaft and normally turning the same and the valve into a closing position preventing a flow of the solder, and means also associated with the reservoir whereby said shaft may be turned manually against said spring action and said valve placed into an open position to permit the flow of the solder, when desired.

2. In a soldering device having a tubular reservoir with heating means associated therewith, and an operating tip member outside of said reservoir and secured to the bottom end thereof, the combination of, a portion of the inner end of said tip member being at one side of the bottom of the reservoir and being accessible, a truncated conical valve seat in said portion, the wider end of said seat being open, a first channel connecting an opening in the side of the valve seat with the reservoir, a second channel connecting an opening in the bottom of the valve seat with the lower end of the operating tip member, a hollow truncated conical valve tightly but rotatably fitting into said valve seat, an opening in the bottom of said valve communicating with said second channel, an opening in the side of said truncated hollow valve communicating with said first channel whereby when said opening in the side of the valve is placed into registering relation with the said first channel soldering material may flow from the reservoir through the valve to the operating tip of the device, a shaft carrying said valve and projecting upwardly generally along said tubular reservoir and outside thereof, spring means acting on said shaft and normally turning the same and the valve into a closing position preventing a flow of the solder, and means also associated with the reservoir whereby said shaft may be turned manually against said spring action and said valve placed into an open position to permit the flow of the solder, when desired, said means to act on the shaft in both mentioned directions including a heat insulating grip secured on said reservoir, a trigger mechanism pivoted in said grip, cooperating means between said trigger mechanism and said shaft, said spring being secured in said grip and acting on said trigger normally keeping said shaft in said closing position, said trigger being adapted to be rocked on its pivot and turn the shaft in the opposite direction against the action of said spring.

3. In a soldering device having a tubular reservoir with heating means associated therewith, and an operating tip member outside of said reservoir and secured to the bottom end thereof, the combination of, a portion of the inner end of said tip member being at one side of the bottom of the reservoir and being accessible, a truncated conical valve seat in said portion, the wider end of said seat being open, a first channel connecting an opening in the side of the valve seat with the reservoir, a second channel connecting an opening in the bottom of the valve seat with the lower end of the operating tip member, a hollow truncated conical valve tightly but rotatably fitting into said valve seat, an opening in the bottom of said valve communicating with said second channel, an opening in the side of said truncated hollow valve communicating with said first channel whereby when said opening in the side of the valve is placed into registering relation with the said first channel soldering material may flow from the reservoir through the valve to the operating tip of the device, a shaft carrying said valve and projecting upwardly generally along said tubular reservoir and outside thereof, spring means acting on said shaft and normally turning the same and the valve into a closing position preventing a flow of the solder, and means also associated with the reservoir whereby said shaft may be turned manually against said spring action and said valve placed into an open position to permit the flow of the solder, when desired, spring means acting in an axial direction on said shaft and said valve whereby said conical valve will be kept pressed on its conical seat.

4. In a soldering device having a tubular reservoir with heating means associated therewith, and an operating tip member outside of said reservoir and secured to the bottom end thereof, the combination of, a portion of the inner end of said tip member being at one side of the bottom of the reservoir and being accessible, a truncated conical valve seat in said portion, the wider end of said seat being open, a first channel connecting an opening in the side of the valve seat with the reservoir, a second channel connecting an opening in the bottom of the valve seat with the lower end of the operating tip member, a hollow truncated conical valve tightly but rotatably fitting into said valve seat, an opening in the bottom of said valve communicating with said second channel, an opening in the side of said truncated hollow valve communicating with said first channel whereby when said opening in the side of the valve is placed into registering relation with the said first channel soldering material may flow from the reservoir through the valve to the operating tip of the device, a shaft carrying said valve and projecting upwardly generally along said tubular reservoir and outside thereof, spring means acting on said shaft and normally turning the same and the valve into a closing position preventing a flow of the solder, and means also associated with the reservoir whereby said shaft may be turned manually against said spring action and said valve placed into an open position to permit the flow of the solder, when desired, said means to act on the shaft in both mentioned directions including a heat insulating grip secured on said reservoir, a trigger mechanism pivoted in said grip, cooperating means between said trigger mechanism and said shaft, said spring being secured in said grip and acting on said trigger normally keeping said shaft in said closing position, said trigger being adapted to be rocked on its pivot and turn the shaft in the opposite direction against the action of said spring, said spring being in the form of a flat strip folded and arranged in an opening in said grip, said trigger being arranged in the same opening and pivoted therein, the end of one arm of the folded flat spring encircling the upper end of said shaft adapted to provide bearing for the same to press the same axially with the valve thereon against the valve seat, the other folded branch of said flat spring engaging said trigger and yieldingly keeping the same and the shaft operated on by it in said closing position.

5. In a soldering device having a tubular reservoir with heating means associated therewith, and an operating tip member outside of said reservoir and secured to the bottom end thereof, the combination of, a portion of the inner end of said tip member being at one side of the bottom of the reservoir and being accessible, a truncated conical valve seat in said portion, the wider end of said seat being open, a first channel connecting an opening in the side of the valve seat with the reservoir, a second channel connecting an opening in the bottom of the valve seat with the lower end of the operating tip member, a hollow truncated conical valve tightly but rotatably fitting into said valve seat, an opening in the bottom of said valve communicating with said second channel, an opening in the side of said truncated hollow valve communicating with said first channel whereby when said opening in the side of the valve is placed into registering relation with the said first channel, soldering material may flow from the reservoir through the valve to the operating tip of the device, a shaft carrying said valve and projecting upwardly generally along said tubular reservoir and outside thereof, spring means acting on said shaft and normally turning the same and the valve into a closing position preventing a flow of the solder, and means also associated with the reservoir whereby said shaft may be turned manually against said spring action and said valve placed into an open position to permit the flow of the solder, when desired, said means to act on the shaft in both mentioned directions including a heat insulating grip secured on said reservoir, a trigger mechanism pivoted in said grip, cooperating means between said trigger mechanism and said shaft, said spring being secured in said grip and acting on said trigger normally keeping said shaft in said closing position, said trigger being adapted to be rocked on its pivot and turn the shaft in the opposite direction against the action of said spring, said spring being in the form of a flat strip folded and arranged in an opening in said grip, said trigger being arranged in the same opening and pivoted therein, the end of one arm of the folded flat spring encircling the upper end of said shaft adapted to provide bearing for the same and to press the same axially with the valve thereon against the valve seat, the other folded branch of said flat spring engaging said trigger and yieldingly keeping the same and the shaft operated on by it in said closing position, said grip being removably secured on said reservoir whereby the same and the shaft and the valve thereon may be removed from the reservoir, when desired.

6. In a device of the character described, a tubular reservoir, an operating tip member secured to the bottom end thereof, and being outside of the same, an accessible portion in said tip, a conical open valve seat in said portion, an opening being provided in the side of the valve seat and a channel therefrom to the reservoir, and a second opening being provided at the bottom of said valve seat, and a second channel from said second opening to the outer end of the operating tip, a hollow conical valve in said seat open at the bottom whereby the inside thereof communicates with said second channel, another opening in the side of said valve adapted to cooperate with the opening in the side of the valve seat when desired, said second opening in the side of the valve being elongated, transverse to the axis of the valve, wider in its center and narrowing to points at both ends, and means to rotate the valve when desired.

OSCAR WERTHEIM.
NORMAN N. MOSS.

REFERENCES CITED

The following references are of record in the file of this patent:

UNITED STATES PATENTS

| Number | Name | Date |
|---|---|---|
| 839,506 | McMullen | Dec. 25, 1906 |
| 1,127,970 | Dryfoos | Feb. 9, 1915 |
| 1,171,232 | Muller | Feb. 8, 1916 |
| 1,927,570 | Lofthouse | Sept. 19, 1933 |
| 1,934,885 | Ring | Nov. 14, 1933 |
| 1,957,325 | Davis | May 1, 1934 |
| 2,068,728 | Amos | Jan. 26, 1937 |
| 2,423,900 | Parker | July 15, 1947 |

FOREIGN PATENTS

| Number | Country | Date |
|---|---|---|
| 20,111 | Switzerland | Sept. 28, 1899 |